US011486814B2

(12) United States Patent
D'Apuzzo et al.

(10) Patent No.: US 11,486,814 B2
(45) Date of Patent: Nov. 1, 2022

(54) PARTICLE SORTING USING MICROFLUIDIC EJECTORS

(71) Applicant: Hewlett-Packard Development Company, L.P., Spring, TX (US)

(72) Inventors: Fausto D'Apuzzo, Palo Alto, CA (US); Viktor Shkolnikov, Palo Alto, CA (US); Yang Lei, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/255,761

(22) PCT Filed: Oct. 1, 2018

(86) PCT No.: PCT/US2018/053712
§ 371 (c)(1),
(2) Date: Dec. 23, 2020

(87) PCT Pub. No.: WO2020/072028
PCT Pub. Date: Apr. 9, 2020

(65) Prior Publication Data
US 2021/0270721 A1      Sep. 2, 2021

(51) Int. Cl.
*G01N 15/14* (2006.01)
*G01N 15/02* (2006.01)
(Continued)

(52) U.S. Cl.
CPC ..... *G01N 15/1463* (2013.01); *G01N 15/0227* (2013.01); *G01N 15/1429* (2013.01);
(Continued)

(58) Field of Classification Search
CPC ........... G01N 15/1463; G01N 15/0227; G01N 15/1429; G01N 15/1434; G01N 15/1459; G01N 2015/0038; G01N 2015/1006; G01N 2015/1488; G01N 2015/149; G01N 2015/1493
See application file for complete search history.

(56) References Cited

U.S. PATENT DOCUMENTS

| | | |
|---|---|---|
| 6,576,460 B1 | 6/2003 | Baeumner et al. |
| 6,622,746 B2 | 9/2003 | Yang et al. |
| 7,214,298 B2 | 5/2007 | Spence et al. |
| 8,684,980 B2 | 4/2014 | Hunter et al. |
| 2008/0261326 A1 | 10/2008 | Dudenhoefer et al. |

(Continued)

FOREIGN PATENT DOCUMENTS

WO    WO-2020072031 A1 *   4/2020   ......... G01N 15/0227

OTHER PUBLICATIONS

Dhar, et al., "Label-free enumeration, collection and downstream cytological and cytogenetic analysis of circulating tumor cells", Scientific reports 6 (2016): 35474, 12 pgs.
(Continued)

*Primary Examiner* — Roy M Punnoose
(74) *Attorney, Agent, or Firm* — Thorpe North & Western LLP

(57) ABSTRACT

A system and a method for sorting particles are provided. An example of a particle sorting system includes an array that includes a number of microfluidic ejectors. An optical sensor is focused on the array. A controller is used to identify a target particle proximate to a microfluidic ejector, and activate the microfluidic ejector to eject the target particle into a collection vessel.

16 Claims, 15 Drawing Sheets

(51) Int. Cl.
G01N 15/00 (2006.01)
G01N 15/10 (2006.01)

(52) U.S. Cl.
CPC ..... *G01N 15/1434* (2013.01); *G01N 15/1459* (2013.01); *G01N 2015/0038* (2013.01); *G01N 2015/1006* (2013.01); *G01N 2015/149* (2013.01); *G01N 2015/1488* (2013.01); *G01N 2015/1493* (2013.01)

(56) References Cited

U.S. PATENT DOCUMENTS

| | | | | |
|---|---|---|---|---|
| 2011/0312081 | A1* | 12/2011 | Azimi | C12Q 1/68 422/509 |
| 2012/0220022 | A1 | 8/2012 | Ehrlich et al. | |
| 2013/0258075 | A1* | 10/2013 | Muraki | G01N 15/1404 348/61 |

OTHER PUBLICATIONS

Girault, et al., "An on-chip imaging droplet-sorting system: a real-time shape recognition method to screen target cells in droplets with single cell resolution", Scientific reports 7, No. 1 (2017): 1-10.

Heo, et al., "Real-time image processing for microscopy-based label-free imaging flow cytometry in a microfluidic chip", Scientific reports 7, No. 1 (2017): 1-9.

Lin, et al., "Microfluidic cell counter/sorter utilizing multiple particle tracing technique and optically switching approach", Biomedical microdevices 10, No. 1 (2008): 55-63.

Yasuda, et al., "Non-destructive on-chip imaging flow cell-sorting system for on-chip cellomics", Microfluidics and Nanofluidics 14, No. 6 (2013): 907-931.

Yu, et al., "An integrated microfluidic device for the sorting of yeast cells using image processing", Scientific reports 8, No. 1 (2018): 1-12.

* cited by examiner

200

600

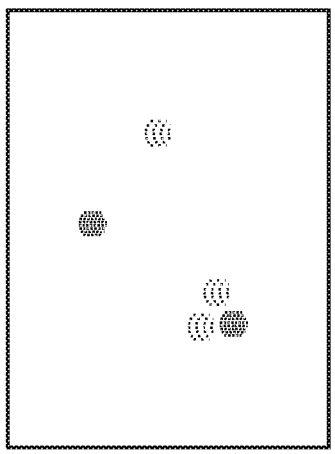
(A)
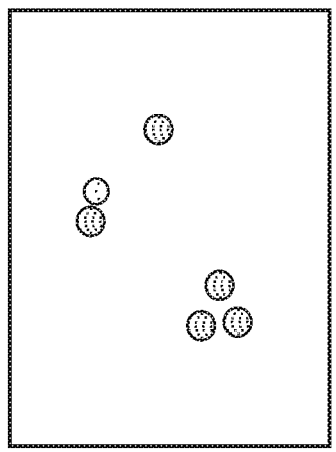
(B)
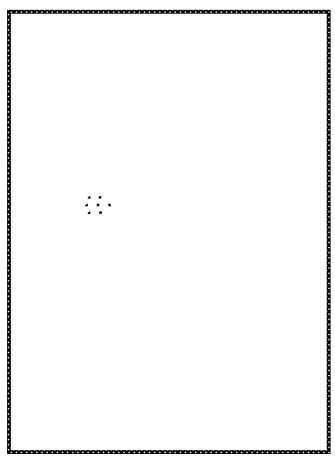
(C)
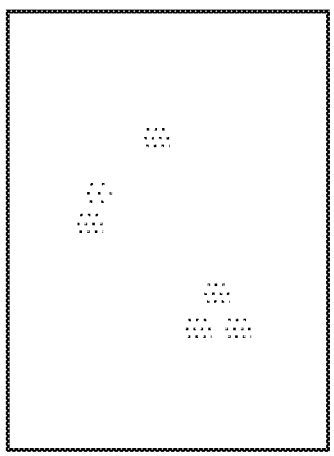
(D)
FIG. 11
1100

1200

PARTICLE SORTING USING MICROFLUIDIC EJECTORS

BACKGROUND

Currently, Florescence Activated Cell Sorting (FACS) is a primary technique for sorting cells in research laboratories. In FACS, a vibrating flow cell is used to create a line of droplets. As the droplets exit the vibrating flow cell, optical systems are used to collect averaged optical information, such as average fluorescence and scattering of the cells in the droplets. The droplets are electrically charged and deflected into different collection tubes based on the electrical charge.

DESCRIPTION OF THE DRAWINGS

Certain exemplary embodiments are described in the following detailed description and in reference to the drawings, in which:

FIGS. 11(A) through (D) are drawings of cells imaged using various fluorescent dyes, in accordance with examples;

DETAILED DESCRIPTION

Current FACS systems are complex, expensive, and need specialized personnel to maintain and operate. Accordingly, simpler systems would be valuable.

Systems and a method are disclosed herein for optical sorting of particles, such as cells, via non-destructive and continuous optical monitoring of an array of microfluidic ejectors. The microfluidic ejectors are similar to ejectors used in ink-jet printers and may include thermally actuated ejectors and piezoelectric cell ejectors.

The system includes a reservoir with a fluid solution containing particles which differ by shape, fluorescence or size, or other properties that can be optically discriminated. The particles may include cells. The reservoir feeds a chamber that feeds independently controlled ejector nozzles. An imaging system, such as a microscope, monitors the feed to the ejectors without interfering with ejected material reaching a target destination, such as a well in a multi-well plate or other container. The imaging system includes an annular mirror, for example, having a central aperture, that is placed in the optical path to focus the imaging system on the microfluidic ejectors. Ejected droplets containing the target particles pass through the aperture into the target destination.

Targeted particles are selected by a controller that processes the images collected by the optical system. The targeted particles are then physically sorted by actuating the microfluidic ejectors in tandem with other devices. In one example, an x-y stage supporting a multi well plate is moved to place a collection vessel under the microfluidic ejector to capture a droplet holding the particle. In some examples, an ejected droplet may be charged, and an electric field applied in an orthogonal direction to the nominal trajectory of the droplet, deflecting the droplet towards a container. The electrodes can be integrated onto the mirror surface or, in some examples, are plates placed below the mirror. The two techniques may be used in tandem, for example, an x-y stage moves a group of collection vessels under the microfluidic ejector, and an electric field is used to steer the droplet into the collection vessel.

Figure 1:
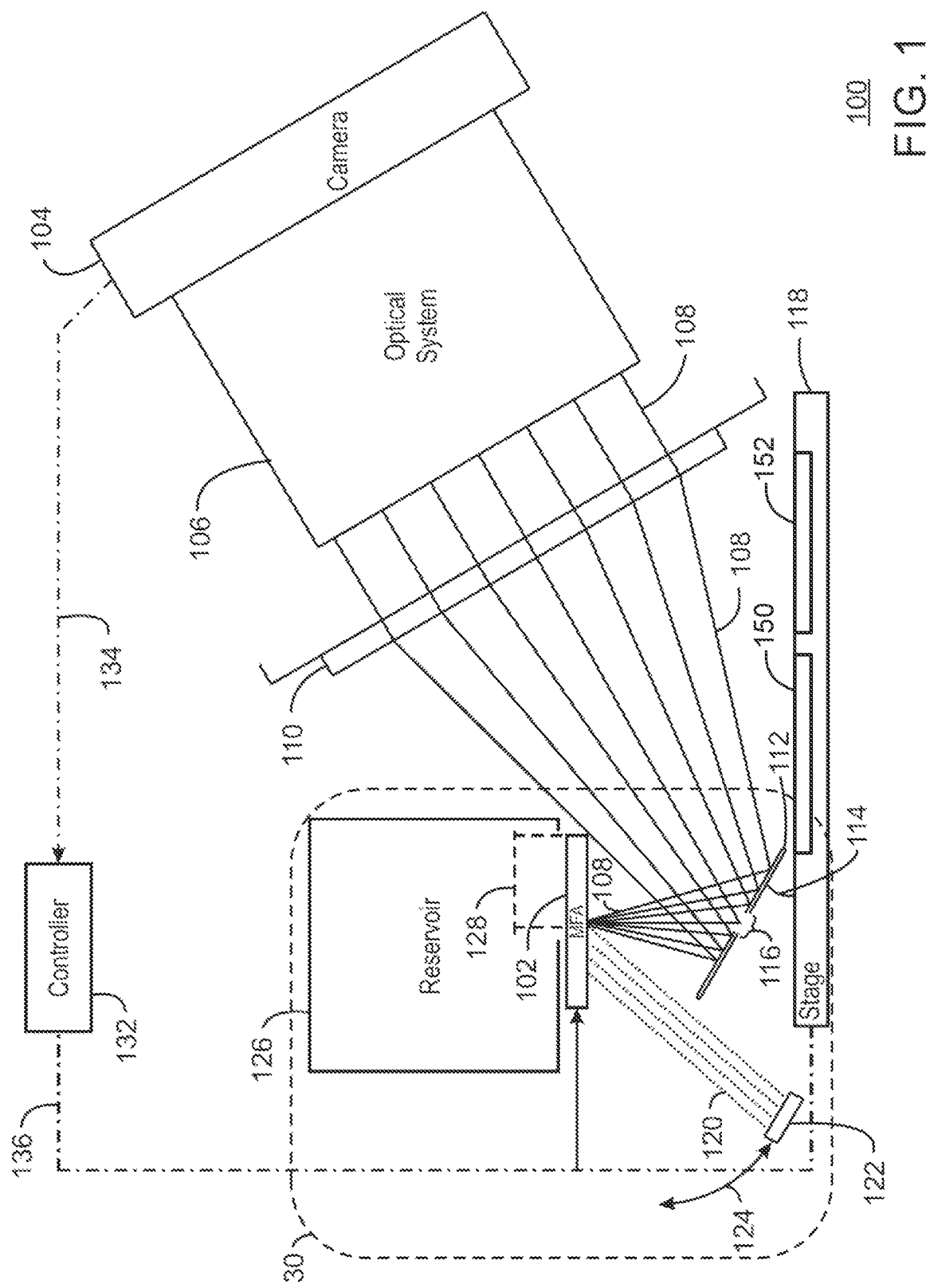
FIG. 1 is a drawing of a particle sorting system that uses a microfluidic ejector array, in accordance with examples.

FIG. 1 is a drawing of a particle sorting system 100 that uses a microfluidic ejector array 102, in accordance with examples. The particle sorting system 100 has an optical sensor, such as a camera 104, to collect images of the microfluidic ejector array 102. The camera 104 may include a high frame rate imaging system, a charge coupled device (CCD), a photodiode array, a multichannel spectrophotometer, or any number of other optical sensors. An optical system 106 is used to process the incoming light 108 arriving from the microfluidic ejector array 102 and focus it on the sensor of the camera 104.

As described herein, in some examples, the microfluidic ejectors of the microfluidic ejector array 102 use thermal resistors to eject fluids from nozzles by heating to create bubbles that force fluid from the nozzles. In other examples, the microfluidic ejectors use piezoelectric cells to force fluid from the nozzles.

The optical system 106 may include lenses, filters, diffraction gratings, and other devices to focus the incoming light 108 on a sensor array in the camera 104. In some examples, the optical system 106 includes a monochromator that allows a narrow frequency band of the incoming light 108 to reach the camera 104. In various examples, the monochromator is adjusted to different frequencies of the incoming light 108 for operation. In other examples, the optical system 106 divides the incoming light 108 into different channels, each of which are sent to a different sensor within the camera 104, providing multispectral analysis of the incoming light 108. In various examples, the optical system 106 and camera 104 are used to perform brightfield, dark-field, florescence, hyperspectral, and other optical analyses.

A focusing lens 110 is used to focus the optical system 106 on the incoming light 108 coming from the microfluidic ejector array 102. The focusing lens 110 may be a single lens, a group of lenses, or other optical apparatus. In an example, the focusing lens 110 is a Fresnel lens, providing a wide area lens without adding significant complexity. In other examples, the focusing lens 110 is integrated with the optical system, and includes multiple elements, such as a microscope objective.

An annular mirror 112 is used to direct the light from the microfluidic ejector array 102 towards the focusing lens 110. The annular mirror 112 is placed at an angle 114 that is appropriate for the imaging, such as 30°, 45°, and the like. An opening 116 in the annular mirror 112 is positioned directly under the microfluidic ejector array 102 to allow droplets from the microfluidic ejectors to pass through to a stage 118 located below the annular mirror 112. In various examples, the opening 116 is about 0.5 mm in diameter, about 1 mm in diameter, or about 2 mm in diameter, among others. In other examples, the opening 116 is generally oblong, for example, an oval that is about 1 mm across and about 3 mm long, or about 0.5 mm across and about 1.5 mm long, and aligned with the microfluidic ejector array 102.

The stage 118 may be moved to place different vessels under the microfluidic ejector array 102. Examples of such vessels include a collection vessel 150, such as individual wells on a multi-well plate; a waste vessel 152 (or waste collection vessel), such as a waste container; a micro sample tube; or any combinations thereof. Similar vessels may be present in other examples shown in any of the FIGS. herein, though not specifically shown. In some examples, the stage 118 is an X-Y translation stage, or X-Y stage, that can move any of a number of wells in an X-Y grid in a multiwell plate. In other examples, the stage 118 is a linear translation stage that can move a micro sample tube under a microfluidic ejector in the microfluidic ejector array 102 for collection or disposal of particles.

The microfluidic ejector array 102 may be lit using any number of different techniques. In some examples, illumination 120 from a light source 122 is directed towards the microfluidic ejector array 102. The illumination 120 may be focused on the microfluidic ejector array 102, or broadly illuminate the base of the cartridge. In various examples, this is adjusted to determine whether a bright-field or a dark-field imaging technique is used. Further, the light source 122 may be moved to different locations relative to the microfluidic ejector array 102, as indicated by arrow 124. In other examples, the optical system 106 may include a co-linear illumination system as described with respect to FIG. 3. In some examples, the light source 122 is a laser, such as a laser photodiode.

A reservoir 126 holds a fluid that includes the particles, or cells in one example, of interest. The particles differ by a shape, florescence or other spectroscopic properties, size, or other properties that may be determined by imaging. The reservoir 126 feeds into a chamber 128 that feeds the microfluidic ejector array 102. In one example, the chamber 128 is around 6 mm in size and is fluidically coupled to the nozzles of the microfluidic ejector array 102.

The reservoir 126, chamber 128, microfluidic ejector array 102, stage 118, and light source 122 may form a particle sorting unit 130. The particle sorting unit 130 may be assembled from individual parts, or may be made into a single integrated unit for easier handling.

The particle sorting system 100 includes a controller 132 that is coupled to the camera 104 through an image data link 134. The controller 132 may analyze images from the camera 104 to identify target particles, such as cells, proximate to a microfluidic ejector in the microfluidic ejector array 102. The controller 132 is also coupled through control links 136 to the microfluidic ejectors of the microfluidic ejector array 102, and to motors controlling the stage 118. In an example, when the controller 132 detects a target particle, proximate to a microfluidic ejector, the controller 132 uses the motors of the stage 118 to move a target well under the microfluidic ejector. The controller 132 then activates a microfluidic ejector to eject the target particle into the target well. The controller 132 then moves a different container, such as a waste container, under the microfluidic ejector to capture non-target particles. The procedures for capturing these particles are discussed in greater detail with respect to FIGS. 4, 5, and 6(A) and (B). The controller 132 itself is discussed in greater detail with respect to FIG. 7.

The optical system 106, camera 104, and annular mirror 112 form an optical device that is used to probe the materials in the microfluidic ejector array 102. In various examples, the optical device is a microscope, fluorimeter, a particle size analyzer, an image recognition system, or a combination thereof.

Figure 2:
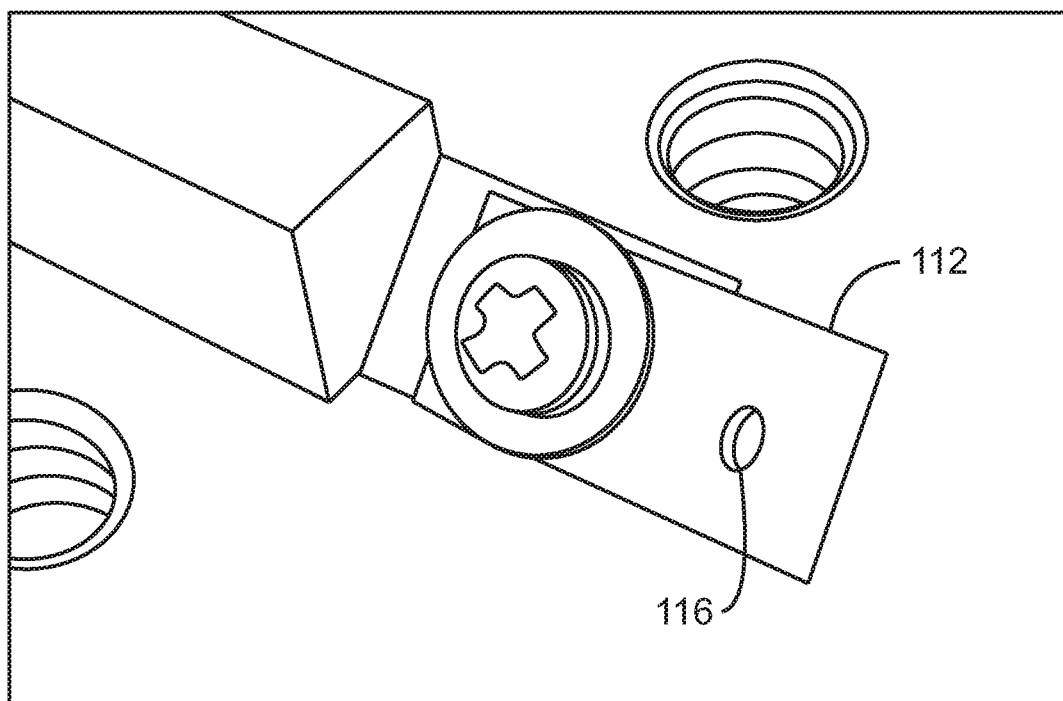
FIG. 2 is a drawing of an annular mirror that may be used in the particle sorting system, in accordance with examples.

FIG. 2 is a drawing 200 of an annular mirror 112 that may be used in the particle sorting system 100, in accordance with examples. Like numbered items are as described with respect to FIG. 1. The drawing 200 shows the opening 116 through which the droplet ejected by a microfluidic ejector passes to reach a target container.

Figure 3:
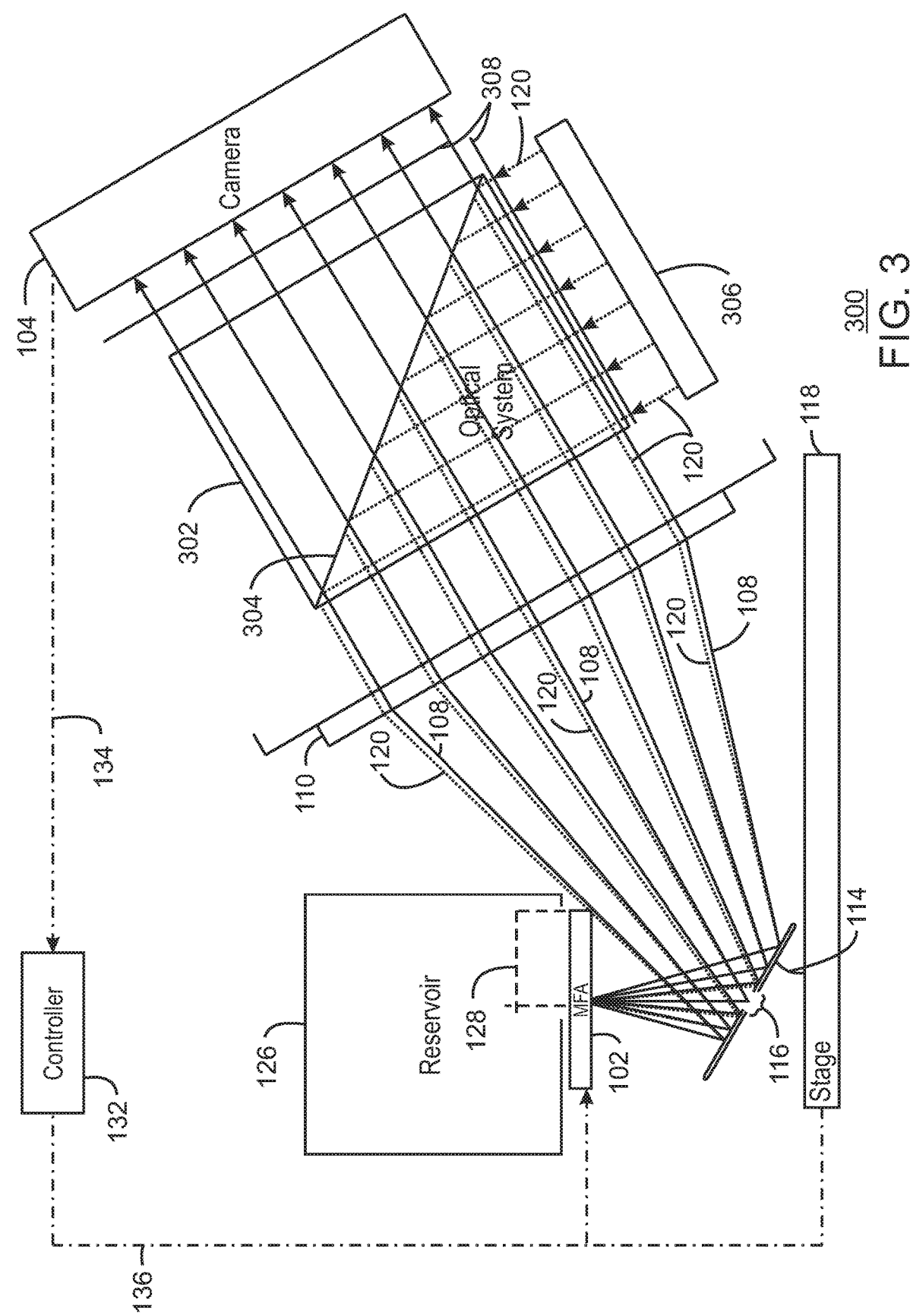
FIG. 3 is a drawing of another particle sorting system in which an illuminating optical system provides co-linear illumination with light returned to the camera, in accordance with examples.

FIG. 3 is a drawing of another particle sorting system 300 in which an illuminating optical system 302 provides co-linear illumination with incoming light 108 returned to the camera 104, in accordance with examples. Like numbered items are as described with respect to FIG. 1. In this example, the illuminating optical system 302 includes a reflective surface 304, such as a partially silvered mirror or a prism, that directs the illumination 120 from a co-linear light source 306 through the focusing lens 110 onto the annular mirror 112 to illuminate the microfluidic ejector array 102. The co-linear light source 306 may include any number of sources of illumination. In an example, the co-linear light source 306 includes an array of light emitting diodes. In another example, the co-linear light source 306 includes a laser and optics to expand the beam and direct it linearly into the illuminating optical system 302.

Incoming light 108 returning from the microfluidic ejector array 102 passes through the reflective surface 304 and is captured by the camera 104. To enhance the amount of incoming light 108 received by the camera 104, filters 308 may be placed between the co-linear light source 306 and the illuminating optical system 302 and between the illuminating optical system 302 and the camera 104. In an example, the filters 308 are polarizing filters that are placed perpendicular to each other. In another example, the filters 308 are at an excitation band, such as a 20 nm bandpass filter centered on a wavelength of about 320 nm, between the co-linear light source 306 and the illuminating optical system 302, and at an emission band, such as a 50 nm bandpass filter centered on a wavelength of about 450 nm, between the illuminating optical system 302 and the camera 104.

In an example of the particle sorting system 300, the optical system is a bright field microscope, which includes a long-working-distance microscope objective, for example, as focusing lens 110, a beam splitter, functioning as reflective surface 304, to couple in the illumination 120 which is made by a fiber-coupled light source (halogen lamp), functioning as the co-linear light source 306 and a light condenser element (positive lens), along with a tube lens comprised between the beam splitter and the camera 104.

Figure 4:
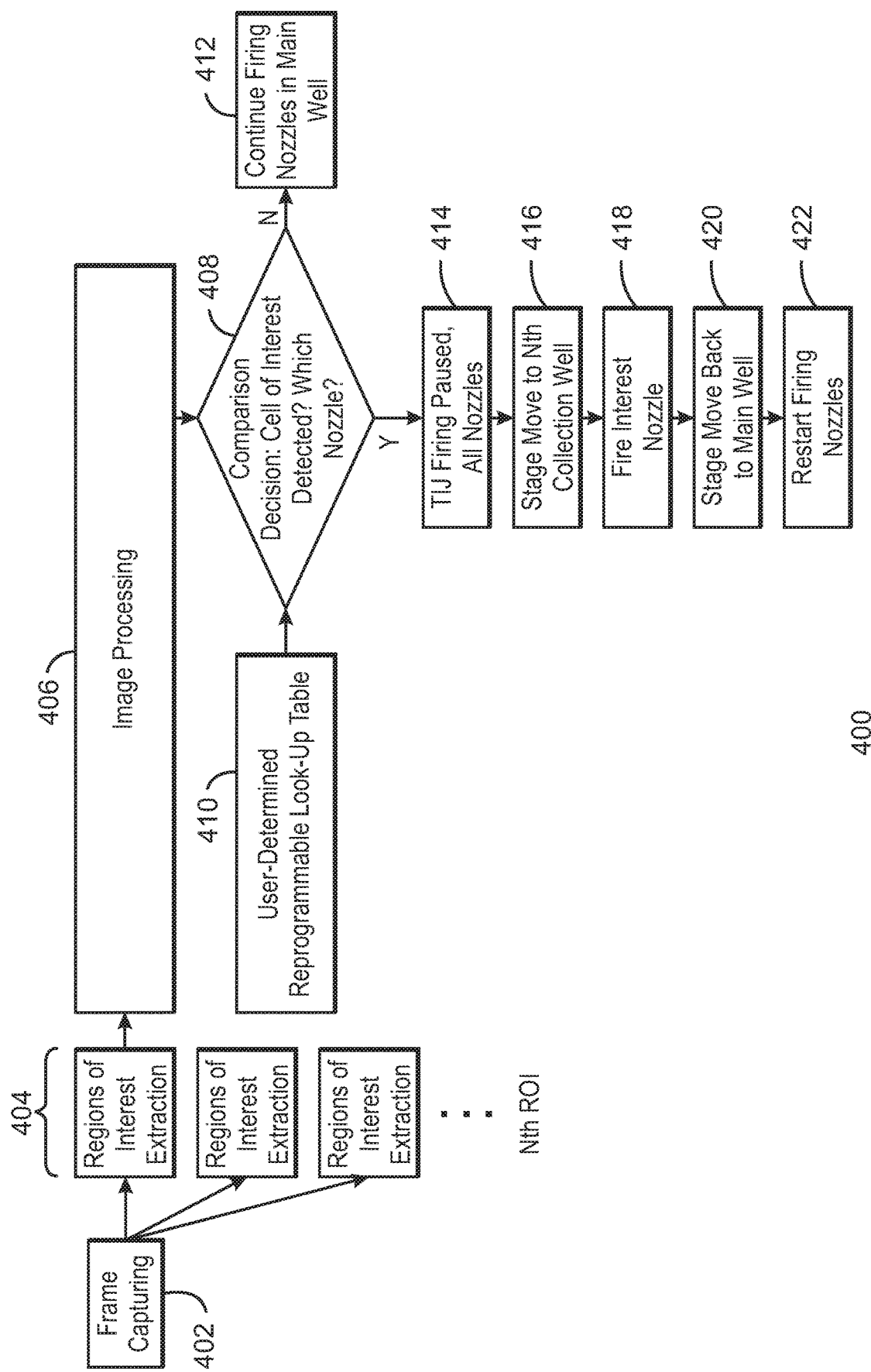
FIG. 4 is a process flow diagram of a method for using image processing to identify particles for sorting using a microfluidic ejector, in accordance with examples.

FIG. 4 is a process flow diagram of a method 400 for using image processing to identify particles for sorting using a microfluidic ejector, in accordance with examples. In various examples, the particles are cells. The method 400 begins at block 402 with capturing a frame from the camera for imaging system.

At block 404, regions of interest in the frame are extracted. In various examples, this is performed by defining a window in a frame in which data of interest will appear. For example, the window may be defined as having an x-coordinate of between about 500 and 550 pixels and a y-coordinate of between about 800 and 850 pixels. In another example, the regions of interest are identified by training an artificial intelligence system to locate nozzles and flow paths in a microfluidic ejector array. This may be performed, for example, by pattern matching or by identifying locations that show intermittent fluorescence, among other techniques.

At block 406, image processing is performed. This may include, for example, removing portions of the frame that are not in the regions of interest, background subtraction, background correction, flatness correction, spatial distortion correction, thresholding, gradient calculations, performing spectroscopic calculations, and the like.

At block 408, a comparison is made as to whether a particle of interest, or target particle, has been detected. This may be performed by comparing the image of a region of interest to an image from a user-determined lookup table 410. If a target particle has been detected, process flow proceeds to block 414.

At block 414, the firing of the microfluidic ejector array is paused. At block 416, the stage is moved to position a collection well under the microfluidic ejector holding the particle of interest. At block 418, the microfluidic ejector holding the particle of interest is fired, ejecting a droplet holding the target particle into the collection well.

At block 420, the stage is moved back to the main well. This may be, for example, a waste collection well. In various examples, the main well may be a separate collection tube. At block 422, the firing of the nozzles is resumed, and process flow returns to block 402.

If at block 408, the determination is made that the particle in the image is not the particle of interest, then process flow proceeds to block 412. At block 412, firing of the nozzles resumes into the main well, or waste vessel, and process flow returns to block 402.

Figure 5:
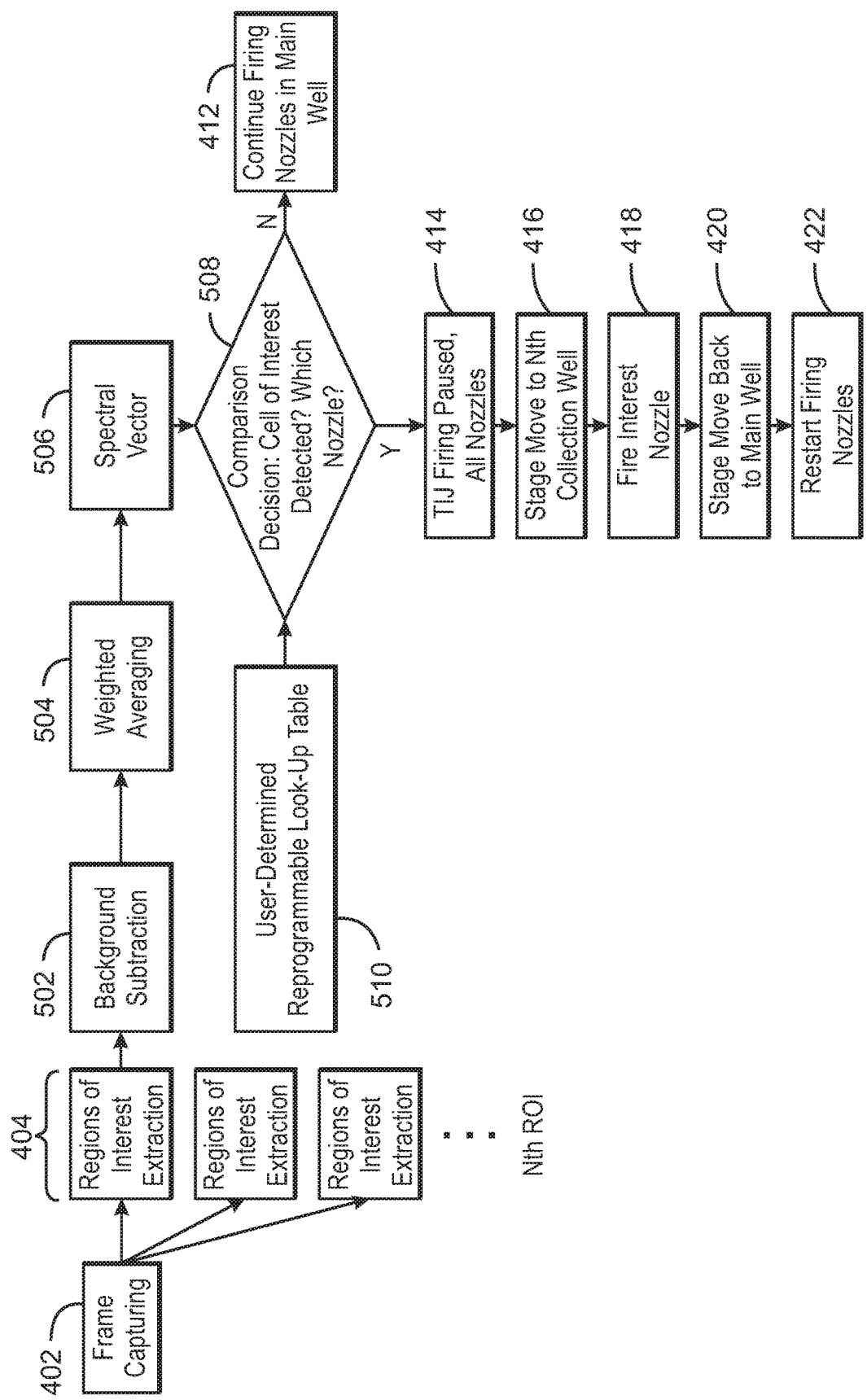
FIG. 5 is a process flow diagram of a method for using spectroscopic techniques to identify particles for sorting using a microfluidic ejector, in accordance with examples.

FIG. 5 is a process flow diagram of a method 500 for using spectroscopic techniques to identify particles for sorting using a microfluidic ejector, in accordance with examples. Like numbered items are as described with respect to FIG. 4. In the user spectroscopic techniques, some variance may be applied from the imaging analysis.

At block 502, a background subtraction is performed to remove fluorescence, or other spectroscopic background issues, from the regions of interest. In an example, this is performed by setting an image that has no particles, or cells, of interest as the background image, and subtracting it from the image of the regions of interest.

At block 504, a weighted average of a number of images of the region of interest is made. If the spectroscopic features for a target particle are substantial, this may not be performed. For example, if the emission from the particle is strong, this may not be desired. In various embodiments, two images, four images, five images, or 10 images, or more may be averaged, depending on the desired increase in the signal-to-noise ratio.

At block 506, a spectral vector is determined. The spectral vector may be a floating point 1D array of the emission power from the particle at a number of discrete wavelengths or integrated wavelength ranges, for example, as enhanced by a number of different fluorescent stains. This is discussed further with respect to FIGS. 9(A)-(D).

At block 508, a comparison is made of the spectral vector with spectral vectors stored in a lookup table 510 holding user determined spectral vectors for a target particle. If the spectral vector of a particle, or cell, in the region of interest matches the spectral vector for a target particle, process flow proceeds to block 414, as described with respect to FIG. 4. If the spectral vector of the particle does not match the spectral vector for a target particle, process flow proceeds to block 412, as described with respect to FIG. 4.

Figure 6A:
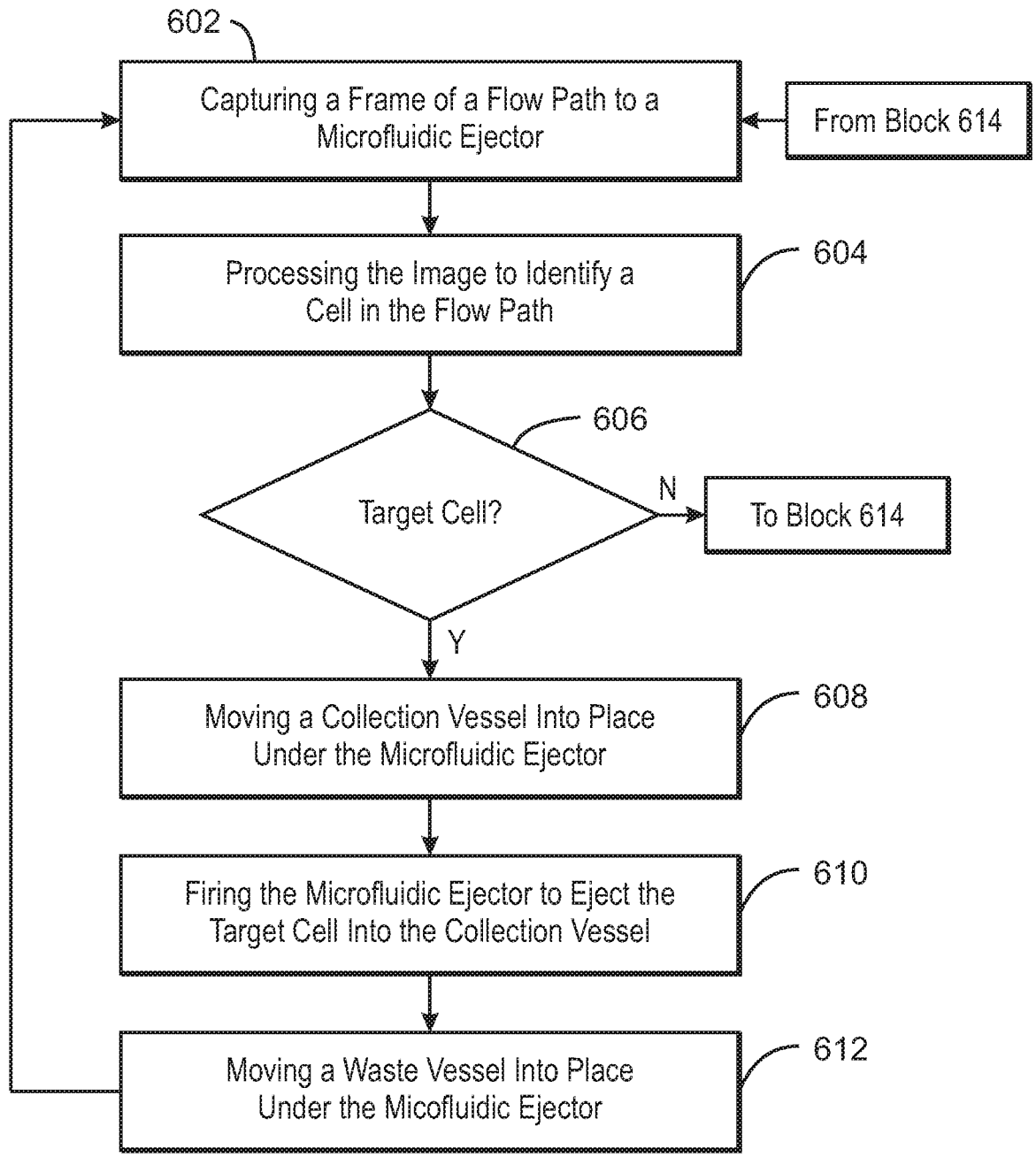
FIGS. 6(A) and (B) are process flow diagrams of a general method for sorting particles using a microfluidic ejector, in accordance with examples.

FIGS. 6(A) and (B) are process flow diagrams of a general method 600 for sorting particles using a microfluidic ejector, in accordance with examples. As shown in FIG. 6(A), the method begins at block 602, with capturing of a frame including a region of interest, such as a flow path to a microfluidic ejector. In the flow path, particles or cells are visible due to the transparent polymer forming the nozzle. In some examples, the material forming the nozzles and flow paths is not transparent. In these examples, the materials in the nozzle itself may be imaged.

At block 604, the image is processed to identify a cell, or other target particle, in the flow path. This may be performed as described with respect to blocks 404 and 406 of FIG. 4, or blocks 404, 502, 504, and 506 of FIG. 5. At block 606, a determination is made as to whether a target cell, or particle, is in the flow path.

If a target particle is in the flow path, at block 608, a collection vessel is moved into place under the microfluidic ejector. In some examples, this is performed by moving a target well in a multiwell plate into position under the microfluidic ejector using an X-Y stage. In other examples, this is performed by moving a micro sample tube under the microfluidic ejector using a linear translation stage. In various examples, the actions described with respect to blocks 602 through 608 are repeated to determine if the next particle in the flow path is a target particle that should be collected. In some examples, multiple types of target particles are identified and collected into different wells, or collection vessels.

At block 610, the microfluidic ejector is fired to eject the target particle into the collection vessel. In an example, this is performed by energizing a thermal resistor to form a bubble under the target particle in the nozzle, ejecting a droplet containing the target particle into the collection vessel. In another example, this is performed by energizing a piezoelectric ejector that forces out a droplet containing the target particle into the collection vessel.

At block 612, a waste vessel is moved back into place under the microfluidic ejector. Process flow then resumes at block 602.

Figure 6B:
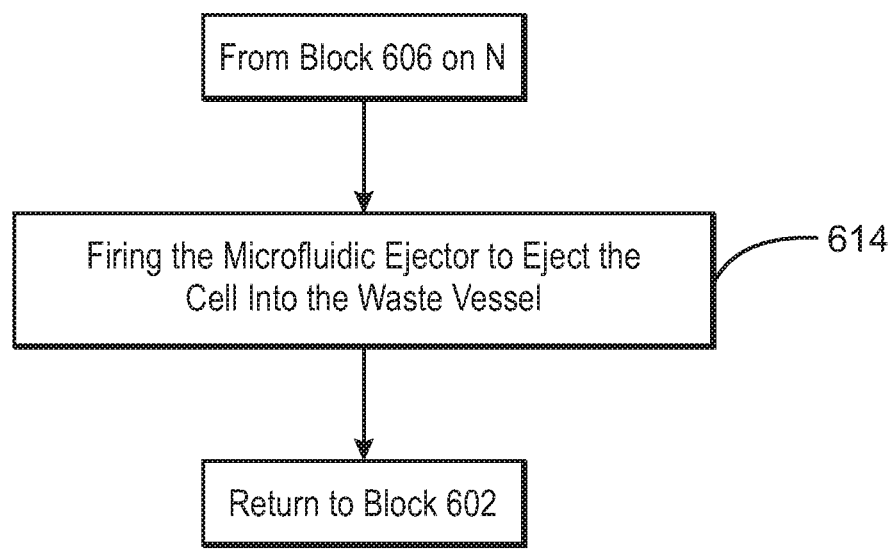

If, at block 606, the particle is determined not to be a target particle, process flow proceeds to block 614, as shown in FIG. 6(B). At block 614, the microfluidic ejector is fired to eject the particle into the waste vessel. Process flow then resumes at block 602.

Figure 7:
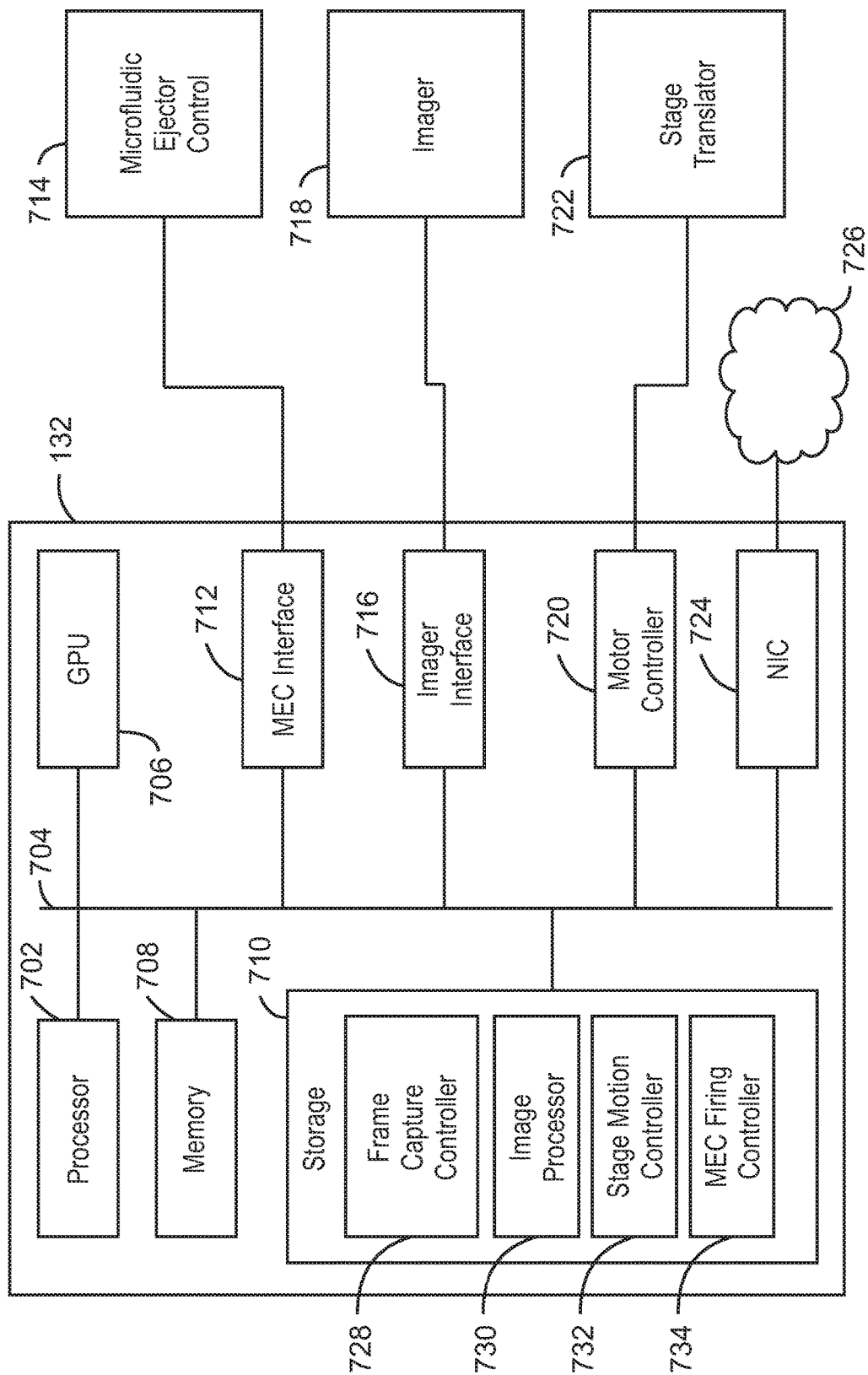
FIG. 7 is a drawing of a controller to perform particle sorting, in accordance with examples.

FIG. 7 is a drawing of a controller 132 to perform particle sorting, in accordance with examples. The controller 132 includes a central processing unit (CPU) 702 that executes stored instructions. In various examples, the CPU 702 is a microprocessor, a system on a chip (SoC), a single core processor, a dual core processor, a multicore processor, a number of independent processors, a computing cluster, and the like.

The CPU 702 is communicatively coupled to other devices in the controller 132 through a bus 704. The bus 704 may include a peripheral component interconnect (PCI) bus, and industry standard architecture (EISA) bus, a PCI express (PCIe) bus, high-performance interconnects, or a proprietary bus, such as used on a system on a chip (SoC).

The bus 704 may couple the processor to a graphics processing unit (GPU) 706, such as units available from Nvidia, Intel, AMD, ATI, and others. If present, the GPU 706 provides graphical processing capabilities to enable the high-speed processing of images from the camera. The GPU 706 may be configured to perform any number of graphics operations. For example, the GPU 706 may be configured to pre-process the plurality of image frames by isolating the region of interest, downscaling, reducing noise, correcting lighting, and the like. In examples that use only spectroscopic techniques, the GPU 706 may not be present.

A memory device 708 and a storage device 710 may be coupled to the CPU 702 through the bus 704. In some examples, the memory device 708 and the storage device 710 are a single unit, e.g., with a contiguous address space accessible by the CPU 702. The memory device 708 holds operational code, data, settings, and other information used by the CPU 702 for the control. In various embodiments, the memory device 708 includes random access memory (RAM), such as static RAM (SRAM), dynamic RAM (DRAM), zero capacitor RAM, embedded DRAM (eDRAM), extended data out RAM (EDO RAM), double data rate RAM (DDR RAM), resistive RAM (RRAM), and parameter RAM (PRAM), among others.

The storage device 710 is used to hold longer-term data, such as stored programs, an operating system, and other code blocks used to implement the functionality of the particle sorting system. In various examples, the storage device 710 includes non-volatile storage devices, such as a solid-state drive, a hard drive, a tape drive, an optical drive, a flash drive, an array of drives, or any combinations thereof. In some examples, the storage device 710 includes non-volatile memory, such as non-volatile RAM (NVRAM), battery backed up DRAM, flash memory, and the like. In some examples, the storage device 710 includes read only memory (ROM), such as mask ROM, programmable ROM (PROM), erasable programmable ROM (EPROM), and electrically erasable programmable ROM (EEPROM).

A number of interface devices may be coupled to the CPU 702 through the bus 704. In various examples, the interface devices include a microfluidic ejector controller (MEC) interface 712, an imager interface 716, and a motor controller 720, among others.

The MEC interface 712 couples the controller 132 to a microfluidic ejector controller 714. The MEC interface 712 directs the microfluidic ejector controller 714 to fire microfluidic ejectors in a microfluidic ejector array, either individually or as a group. As described herein, the firing is performed in response to identification of cell or particle types.

The imager interface 716 couples the controller 132 to an imager 718. The imager interface 716 may be a high-speed serial or parallel interface, such as a PCIe interface, a USB 3.0 interface, a FireWire interface, and the like. In various examples, the imager 718 is a high frame-rate camera configured to transfer data and receive control signals over the high-speed interface. In various examples, the high frame-rate camera clicks images 10 frames per second (fps), 100 fps, 500 fps, 1000 fps, 5000 fps, or higher. High frame-rate cameras that may be used in examples are available from Photron USA, Inc., of San Diego, Calif., Thor-Labs, Inc., of Newton, N.J., or Lumenara Corp., of Ottawa, Ontario, Canada. In some examples, the imager 718 is a multichannel spectroscopic system, or other optical device.

The motor controller 720 couples the controller 132 to a stage translator 722. The motor controller 720 may be a stepper motor controller or a servo motor controller, among others. The stage translator 722 includes motors, sensors, or both coupled to the motor controller 720 to move the stage, and attached collection vessels, under a microfluidic ejector.

A network interface controller (NIC) 724 may be used to couple the controller 132 to a network 726. In various examples, this allows for the transfer of control information to the controller 132 and data from the controller 132 to units on the network 726. The network 726 may be a wide area network (WAN), a local area network (LAN), or the Internet, among others. In some examples, the NIC 724 connects the controller 132 to a cluster computing network, or other high-speed processing system, where image processing and data storage occur. This may be used by controllers 132 that do not include a GPU 706 for graphical processing. In some examples, a dedicated human machine interface (HMI) (not shown) may be included in the controller 132 for local control of the systems. The HMI may include a display and keyboard.

The storage device 710 may include code blocks used to implement the functionality of the particle sorting system. In various examples, the code blocks include a frame capture controller 728 that is used to capture a sequence of frames from the imager 718. In some examples, an image processor 730 is used for processing the image to identify region of interest, process the region of interest to determine particle identity, and determine if a particle type in the image is a target particle type.

A stage motion controller 732 directs the motor controller 720 to move the stage translator 722. In some examples, the motor controller 720 is used to move a capture well on a multiwell plate under a microfluidic ejector to capture a droplet holding a target particle. The motor controller 720 is also used to move a waste container under a microfluidic ejector to capture droplets that do not include a target particle.

An MEC firing controller 734 uses the MEC interface 712 to direct a microfluidic ejector controller 714 to fire a microfluidic ejector. In some examples, this is performed to capture a target particle or send a non-target particle to a waste container.

The particle sorting techniques and systems are not limited to moving a stage to capture particles. In some examples, the ejection of a droplet from a microfluidic ejector may be combined with high voltage fields for steering the droplet, for example, based on dielectrophoresis or electrophoresis, to direct a droplet containing a particle towards a collection vessel.

Figure 8:
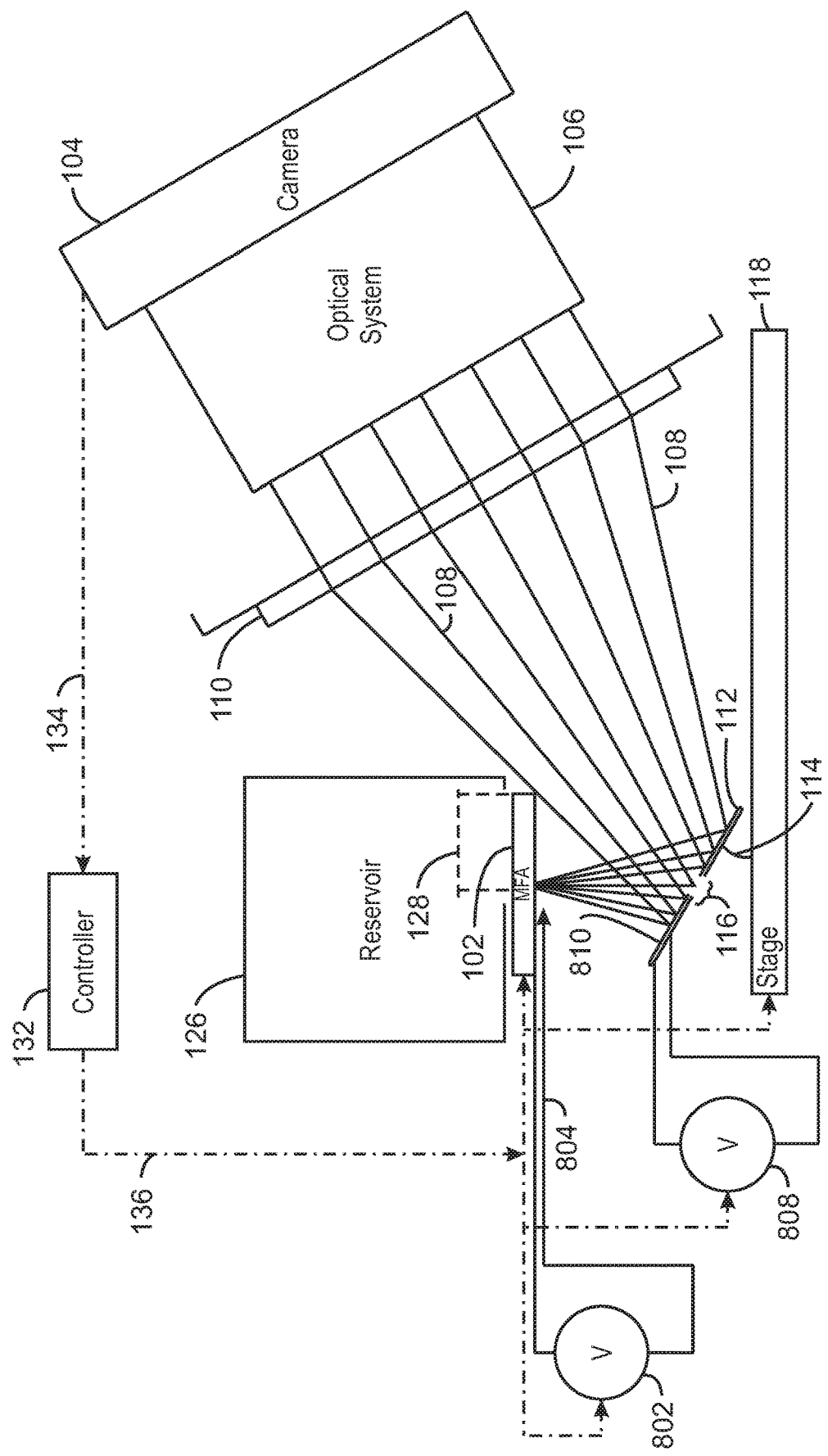
FIG. 8 is a drawing of a particle sorting system that combines microfluidic ejectors with droplet charging systems to steer the droplets, in accordance with examples.

FIG. 8 is a drawing of a particle sorting system 800 that combines microfluidic ejectors with droplet charging systems to steer the droplets, in accordance with examples. Like numbered items are as described with respect to FIG. 1. In the particle sorting system 800 of FIG. 10, the lighting is not shown. However, the particle sorting system 800 may use the light source 122 of FIG. 1, the co-linear light source of FIG. 3, or any other number of other light sources.

A droplet charging system 802, or power supply, uses an electrode 804 to impose an electric charge on a droplet as it is ejected from the microfluidic ejector array 102. The droplet charging system 802 may use a fixed voltage, such as 500 V, 1000 V, 1500 V, or higher, depending on the breakdown voltage in the vicinity of the electrode 804, and the steering voltages used to aim the droplet.

A steering system 808, which is also a power supply, applies high-voltage fields to electrodes placed near the path of the droplets as they move from the microfluidic ejector array 102 to a collection vessel on the stage 118. In an example, electrodes 810 are formed into the annular mirror 112 to steer the droplets as they passed through the opening 116 in the annular mirror. In other examples, the electrodes are plates disposed below the annular mirror 112.

Figure 9:
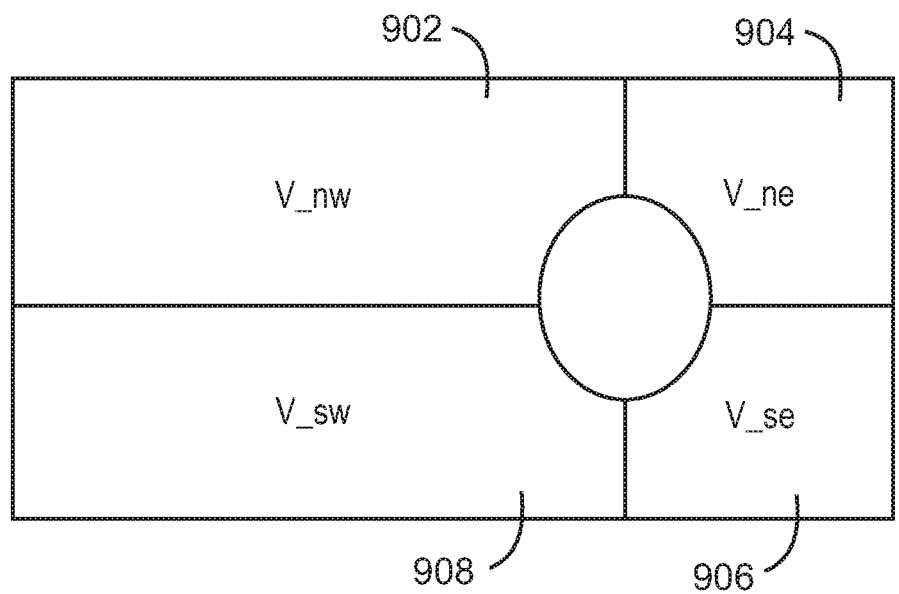
FIG. 9 is a drawing of a mirror that includes high-voltage electrodes for steering droplets, in accordance with examples.

FIG. 9 is a drawing of a mirror 900 that includes high-voltage electrodes 902-908 for steering droplets, in accordance with examples. In the example, the mirror 900 has four electrodes which may have independently applied voltages to steer the droplet. In this example, a positively charged droplet passing through the opening is pulled towards negatively charged electrodes and pushed away from positively charged electrodes. As an example, if the droplet is charged by a positive 500 V electrode after leaving the microfluidic ejector, charging electrode V_nw 902 to 1500 V positive, and electrode V_se 906 to 500 V negative may steer the droplet in the general direction of V_se 906, for example, into a collection vessel underneath V_se 906.

In some examples, the ability to steer the droplet may be combined with the movable stage to select a collection vessel for different types of particles. For example, the stage may be moved to different groups of collection vessels, wherein the specific collection vessel for a particle is determined by the droplet steering voltages. This may enhance the ability of the particle sorting system to quickly sort multiple particle types.

Figure 10:
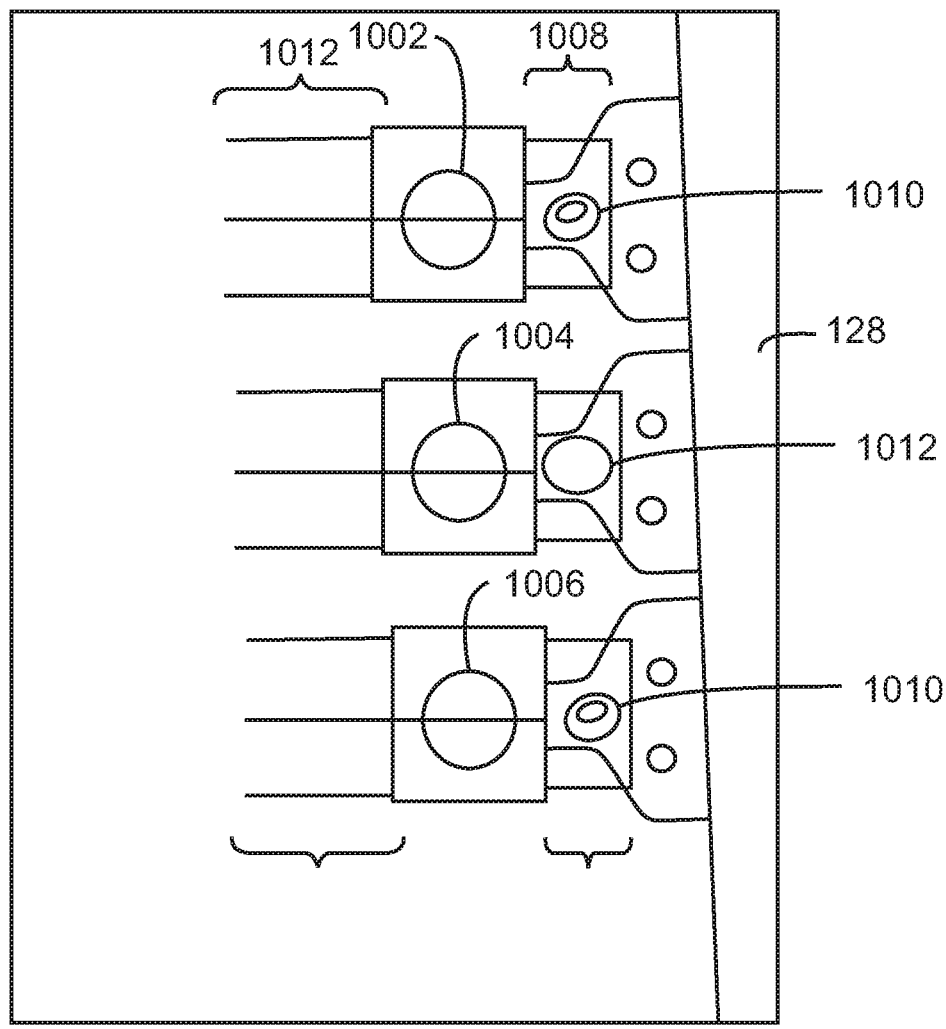
FIG. 10 is an image of nozzles made by an imaging system, in accordance with examples.

FIG. 10 is an image 1000 of nozzles 1002, 1004, and 1006 made by an imaging system, in accordance with examples. The image 1000, or frame, is of a region-of-interest that includes three nozzles 1002, 1004, and 1006. The nozzles 1002-1006 are fed from a chamber 128 through flow channels 1008. In the image 1000, three particles, or cells, in this example, can be seen in the feed zones leading to the nozzles 1002-1006. Two cells 1010 are of identical types, for example, red blood cells. The third cell 1012 is of a different type, for example, being larger than the other two cells 1010.

The size of the cells 1010 and 1012 may be used to determine if the cells are a target type. In this example, the third cell 1012 may be a white blood cell, a cancer cell, or other cell of interest. Accordingly, as described herein, in an example, a collection vessel is moved under the nozzle 1004 holding the third cell 1012, and the microfluidic ejector powering the nozzle 1004 is fired to eject a droplet containing the third cell 1010 into the collection vessel. A waste vessel is then moved under the nozzles 1002-1006, and the microfluidic ejectors powering the nozzles 1002-1006 are fired to eject cells that are not of interest.

In this image 1000, the size may be used to distinguish the different types of cells. However, other techniques, such as fluorescence, may be used to identify cells, as described with respect to FIGS. 11(A)-(D).

FIGS. 11(A) through (D) are drawings 1100 of cells imaged using various fluorescent dyes, in accordance with examples. In this example, three different types of fluorescent dyes are used to stain the cells to fluoresce at different wavelengths. A darker image indicates higher fluorescence. The first dye, shown in FIG. 9(A), is 4',6-diamidino-1-phenylindole (DAPI), which strongly binds to adenine-thymine rich regions in DNA. Generally, the dye is used to stain lysed cells, but the die does diffuse into living cells, albeit at a slow rate.

The second dye, shown in FIG. 11(B), is a cytokeratin (CK) stain which reacts with water-insoluble intra-cytoplasmic structural proteins. These proteins are the dominant proteins of epithelial and hair forming cells. The proteins are also found in epithelial tumors, or carcinomas. Accordingly, the second dye may highlight epithelial tumor cells, which may be sorted from other cells. Other cells that may be highlighted by a CK stain include cells from carcinomas, carcinoid tumors, epithelial organs, and the like. The CK stain may be useful in differentiating a sarcomatoid carcinoma from a sarcoma. In a sarcomatoid carcinoma, malignant cells have properties of both epithelial tumors and mesenchymal tumors ("sarcoma").

The third die, shown in FIG. 11(C), is a CD45 stain. The CD45 stain, or CD45 antibody staining, reacts with alloantigens and all isoforms of the CD45 leukocyte common antigen (LCA). The CD45 protein is a transmembrane glycoprotein is expressed at high levels on a cell surface. Its presence distinguishes leukocytes, or white blood cells, from non-hematopoietic cells, such as lung cells, bone cells, cartilage cells, or fat cells, among others.

As shown in FIG. 11(D), the image collected by the imaging system will include the fluorescence, or fluorescent spectrum, from all of these stained cells. Accordingly, the lookup table may include the amounts that a target cell will fluoresce due to each of a multiple number of stains added to the material. In an example, this is defined as the spectral vector discussed with respect to FIG. 3. This may improve the accuracy of the particle identification during the particle sorting procedure.

Figure 12:
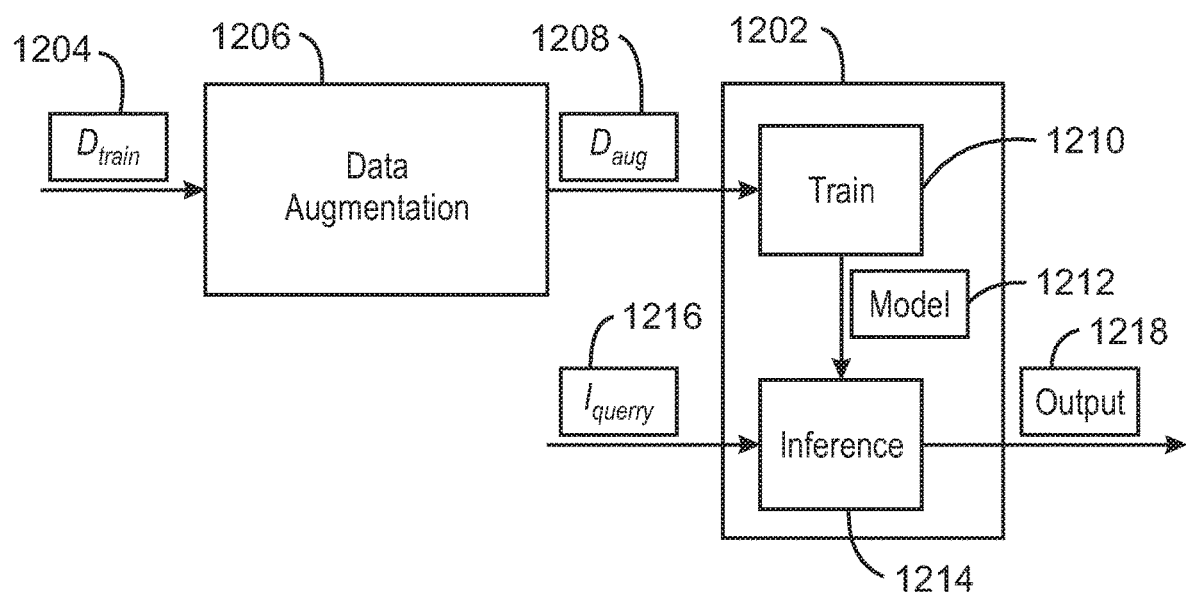
FIG. 12 is a schematic diagram of a process for training and using a convolutional neural network (CNN) to identify particles in regions of interest, in accordance with examples.

FIG. 12 is a schematic diagram of a process 1200 for training and using a convolutional neural network (CNN) 1202 to identify particles in regions of interest, in accordance with examples. In the process 1200, labeled training data sets 1204, which are images with the ground truth identification of particles, are used to train the CNN 1202. As used herein, ground truth indicates that the particles in the image are labeled and identified. The features of the particles may then be used to train the classification model. The feature extraction can be a manual identification of features of particles, or features learned from the training data. In some examples, the model may be used to predict both locations and identification. For these models, the ground truth indicates that the locations (regions of interest), and the type of the particles in the image are labeled and identified. The features of the particles may then be used to train the localization and classification model.

A data augmentation procedure 1206 is used to boost the number of training data sets, and to introduce reasonable variations, for example, to make the identifications more robust. This may be performed by applying some transformations on the original training data set, such as rotation, flipping, or cropping, among others. The data augmentation procedure 1206 generates an augmented data set 1208 that is provided to a training procedure 1210 in the CNN 1202.

The training procedure 1210 generates a model 1212. The model 1212 is used by an inference engine 1214 to perform the identifications described herein. This is performed when a query image 1216 is processed by the inference engine 1214 to generate an output 1218. The output 1218 includes the identifications of particles in the flow channels 1008 (FIG. 10) leading to nozzles associated with microfluidic ejectors. In some examples, the output 1218 may also be used to identify regions of interest, for example, in the form of bounding boxes that indicates portions of the image containing particles.

The choice of feature extraction classification method depends on particle types, and the systems capabilities of data acquisition, including speed, resolution, signal-to-noise ratio, and the like, and computation power, including GPUs, FPGAs, or other dedicated hardware. Examples of morphological features that may be used to identify specific cells may include size, shape, color, the mission intensity, spatial distribution, and the like. Other types of particles, such as cadmium sulfide nanospheres, may have similar morphological features that may be used to identify the particles.

Any number of CNNs and training techniques that are known in the art may be used herein to classify particles. For example, if the location of the region of interest (ROI) is known, for example, the flow channels 1008 (FIG. 10) leading to nozzles, leaving just the object classification, a typical CNN model may be used. In this model, the ROI is defined in the input image, and passed through multiple convolution stages for feature selection. At each convolution stage, a number of convolution kernels may be applied to the image, such as image filtering and feature selection. After feature selection, the classification procedure through multiple neural network layers may identify the type of the feature, for example, a particular cell type, in the image. At the end of the neural network layers in normalized exponential function may be executed to further classify the type of the feature. This may result in a probability vector that, for each class, indicates that the target object belongs in the class. The class with the highest probability is the output.

In various examples, however, simultaneous identification of the region of interest and the classification of the particles in the region of interest is implemented. In this procedure, a deep learning model may be used. A number of models have been developed to solve this problem, which tend to infer localization and classification at the same time. A trade-off between performance and real-time prediction determines the model to be selected.

Examples of these types of models include YOLO (you only look once), Faster R-CNN, SSD, Mask R-CNN, or RetinaNet, among others. The first model, YOLO, uses a single CNN to predict bounding boxes, for regions of interest, and class probabilities, for particle types. See You Only Look Once: Unified, Real-Time Object Detection, Redmon, J.; Divvala, S.; Girshick, R; and Farhadi, A., at https://pjreddie.com/media/files/papers/yolo.pdf (last accessed on Sep. 10, 2018); see also YOLOv2: An Incremental Improvement, Redmon, J; Farhadi, A, at https://pkeddie.com/media/files/papers/YOLOv3.pdf (last accessed on Sep. 10, 2018). The other models mentioned are similarly accessible.

Figure 13:
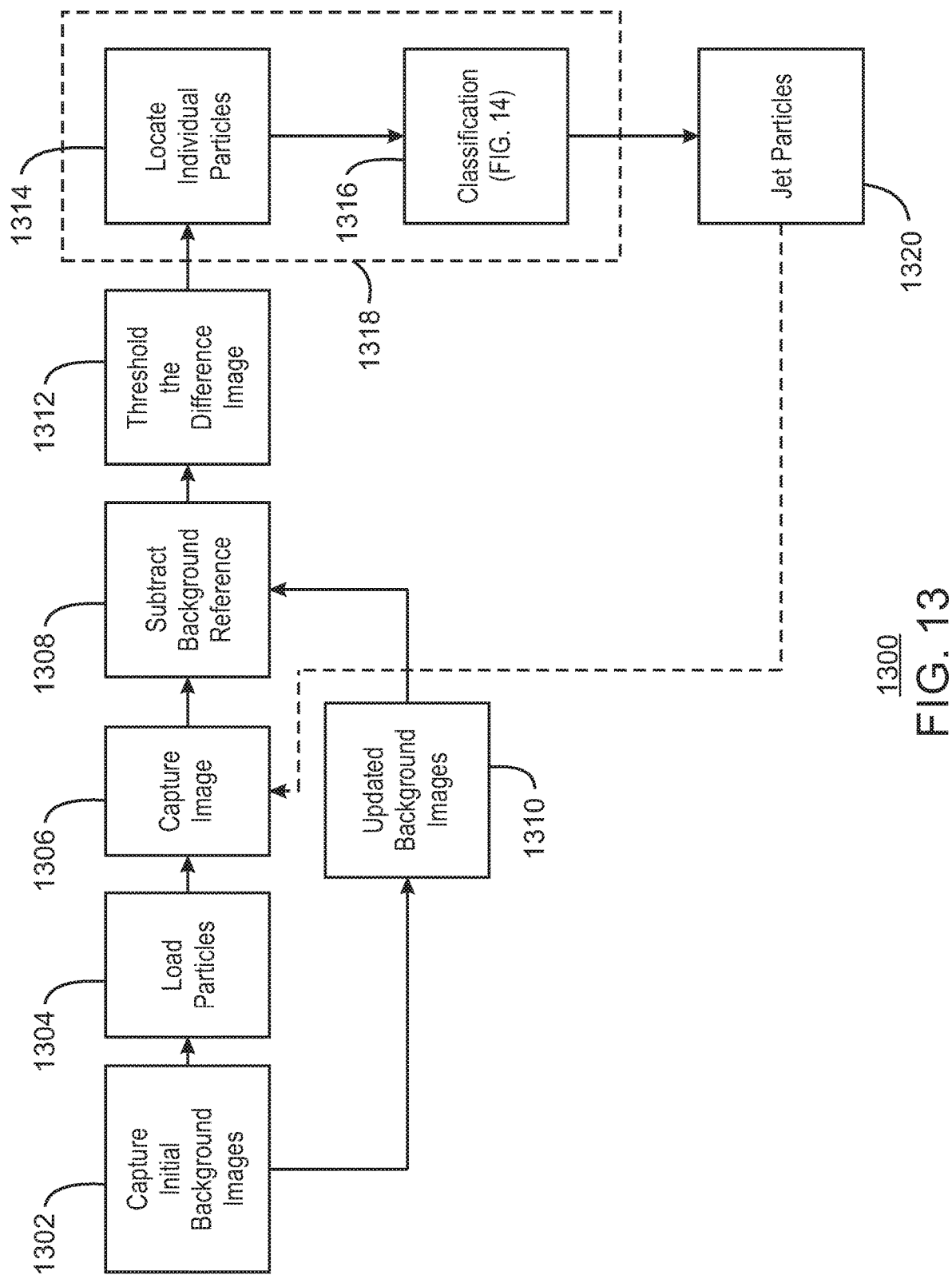
FIG. 13 is a block diagram of a procedure that is used to sort particles, in accordance with examples.
Figure 14:
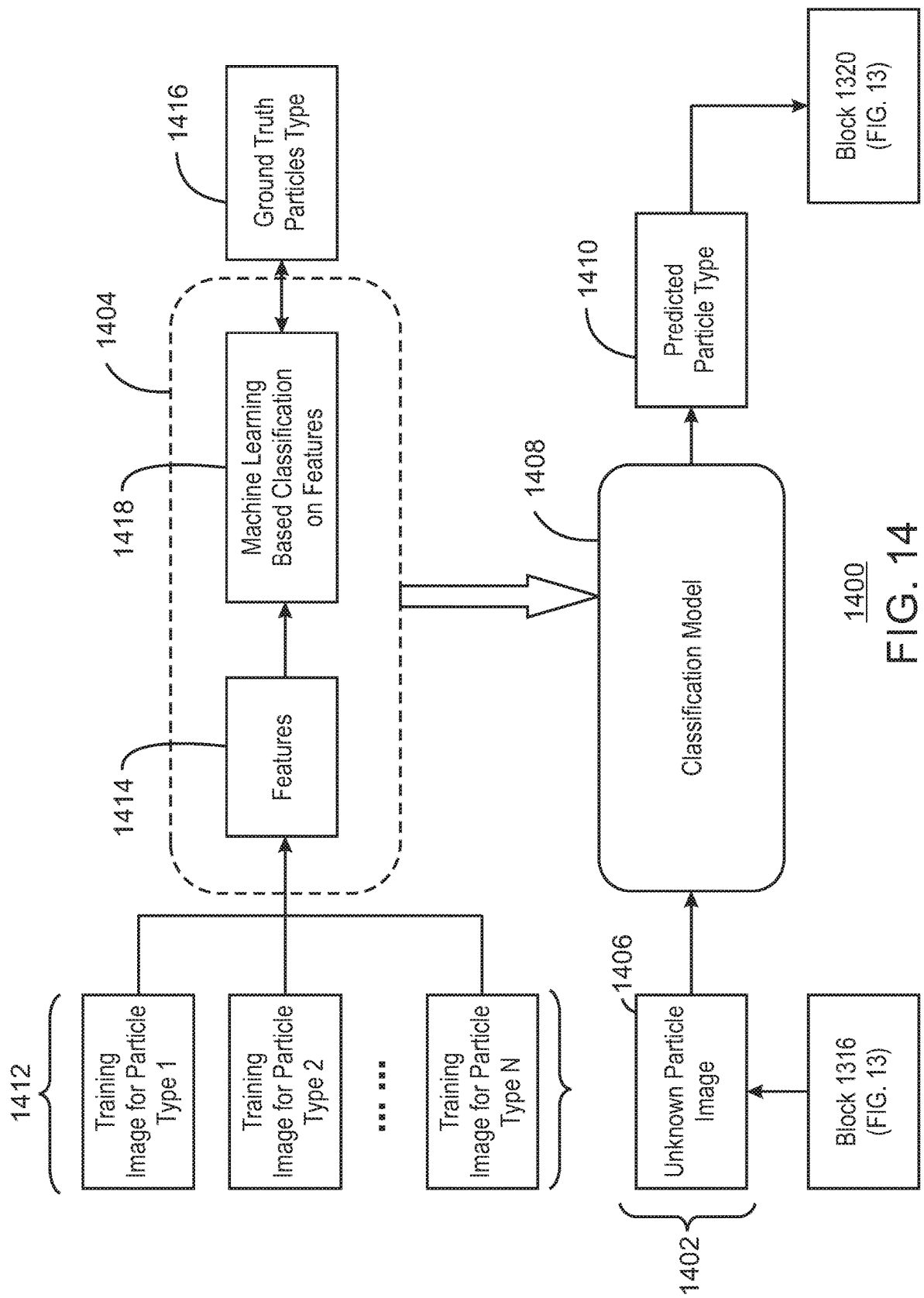
FIG. 14 is a block diagram of a procedure for using and training a model to classify particles, such as cells, in accordance with examples.

FIGS. 13 and 14 are more detailed schematic diagrams for the batch sorting process and the training process. FIG. 13 is a block diagram of a procedure 1300 that is used to sort particles, in accordance with examples. The procedure 1400 shown in FIG. 14 is used to classify the individual particles.

The procedure 1300 begins at block 1302, with the collection of an initial background image or images. This may be performed using the carrier solution with no particles present. The background image is used to compensate for changes in the background. For example, changes in the flow channels may occur if debris or other material sticks.

At block 1304, particles are loaded into the flow channels of the die, for example, by firing the microfluidic ejectors. At block 1306, an image is captured of the die, for example, with the flow channels to the microfluidic ejectors. At block 1308, the background reference 1310 is subtracted from the captured image to create a difference image. At block 1312, the difference image may be processed with a threshold to get a mask of the foreground particles.

At block 1314, the foreground mask may be used to isolate individual particles in the image. The identities of the individual particles may then be classified at block 1316, as described with respect to FIG. 15. In some examples, the location of individual particles and the classification of the particles may be performed using a single CNN procedure 1318, as described with respect to FIG. 12.

At block 1320, the particles are jetted into collection vessels from the microfluidic ejectors. When a target particle is in a nozzle for a microfluidic ejector, the jetting is halted, a collection vessel is moved underneath the microfluidic ejector. The microfluidic ejector is then fired to capture the target particle. A waste collection vessel is then moved underneath the microfluidic ejector. Process flow then returns to block 1306 to collect the next image.

FIG. 14 is a block diagram of a procedure 1400 for using 1402 and training 1404 a model to classify particles, such as cells, in accordance with examples. Using 1402 the model to classify particles begins when an unknown particle image 1406 is provided to a classification model 1408, for example, from block 1316 of FIG. 13. In the classification model 1408, a technique is used to identify the most probable particle type. This may be implemented by a CNN, a support vector machine (SVM), or a simpler technique, such as a lookup table for spectral vectors. This provides a predicted particle type 1410. Process flow then returns to block 1320 of FIG. 13.

The training 1404 of the classification model 1408 is performed by obtaining training images 1412 of the different particle types to be recognized. Features 1414 are extracted from the training images for each of the particle types that distinguish the particle types from other particle types. As described with respect to FIG. 12, the features 1414 may include particle sizes, emission spectra for the particles, correlation of emission spectra to dyes used to stain the particles, and the like. A ground truth identification 1416 of each particle type and the features 1414 may be used by machine learning base classification system 1418, which may explicitly or implicitly correlate the features 1414 to the ground truth identification 1416. In some examples, the explicit correlation is a spectral vector for each particle type, saved to a lookup table. In some examples, the implicit correlation includes weighting factors between nodes in a CNN model. The explicit or implicit correlation is then used as the classification model 1408 for identifying the particle types.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A particle sorting system, comprising:
an array comprising a plurality of microfluidic ejectors;
an optical sensor focused on the array through an annular mirror placed below the array,
wherein the annular mirror is to allow droplets ejected from the plurality of microfluidic ejectors to pass through; and
a controller to:
identify a target particle, based on particle type, proximate to a microfluidic ejector; and
activate the microfluidic ejector to eject the target particle into a collection vessel.

2. The particle sorting system of claim 1, comprising:
a reservoir holding a fluid solution comprising particles; and
flow channels coupling the reservoir to the array.

3. The particle sorting system of claim 1, comprising:
a droplet charging system to impose an electric charge on the droplet ejected from the microfluidic ejector; and
electrodes proximate to the optical sensor coupled to a power supply, comprising an electric field to steer the droplet to the collection vessel.

4. The particle sorting system of claim 1, wherein each of the plurality of microfluidic ejectors comprises a thermal resistor.

5. The particle sorting system of claim 1, wherein each of the plurality of microfluidic ejectors comprises a piezoelectric cell.

6. The particle sorting system of claim 1,
wherein the optical sensor comprises a camera with 10 frames per second or higher frame rate.

7. The particle sorting system of claim 1, wherein the optical sensor comprises a fluorimeter.

8. The particle sorting system of claim 1, wherein the optical sensor comprises a particle size analyzer.

9. The particle sorting system of claim 1, wherein the optical sensor comprises an image recognition system.

10. The particle sorting system of claim 1, wherein the collection vessel comprises a well in a multi-well plate mounted to an x-y stage.

11. A method for sorting particles using the particle sorting system of claim 1, comprising:
capturing a frame of a flow path to the microfluidic ejector;
processing an image from the frame to identify a particle type in the flow path;
determining that the particle is the target particle using the controller; and,
in response to the determining:
moving a collection vessel into place under the microfluidic ejector; and
firing the microfluidic ejector to eject the target particle into the collection vessel.

12. The method of claim 11, comprising:
determining that the particle is not the target particle; and
firing the microfluidic ejector to eject the particle into a waste vessel.

13. The method of claim 11,
wherein processing the image comprises determining an identity of the particle type using image recognition.

14. The method of claim 11, wherein processing the image comprises determining a fluorescent spectrum for particles in the frame.

15. The method of claim 11, comprising steering a droplet comprising the particle into a target container using dielectrophoresis.

16. The method of claim 12, further comprising moving the waste vessel into place under the microfluidic ejector using the controller.

* * * * *